TELEVISION DEFLECTION CIRCUIT WITH TEMPERATURE COMPENSATION
Filed March 28, 1966
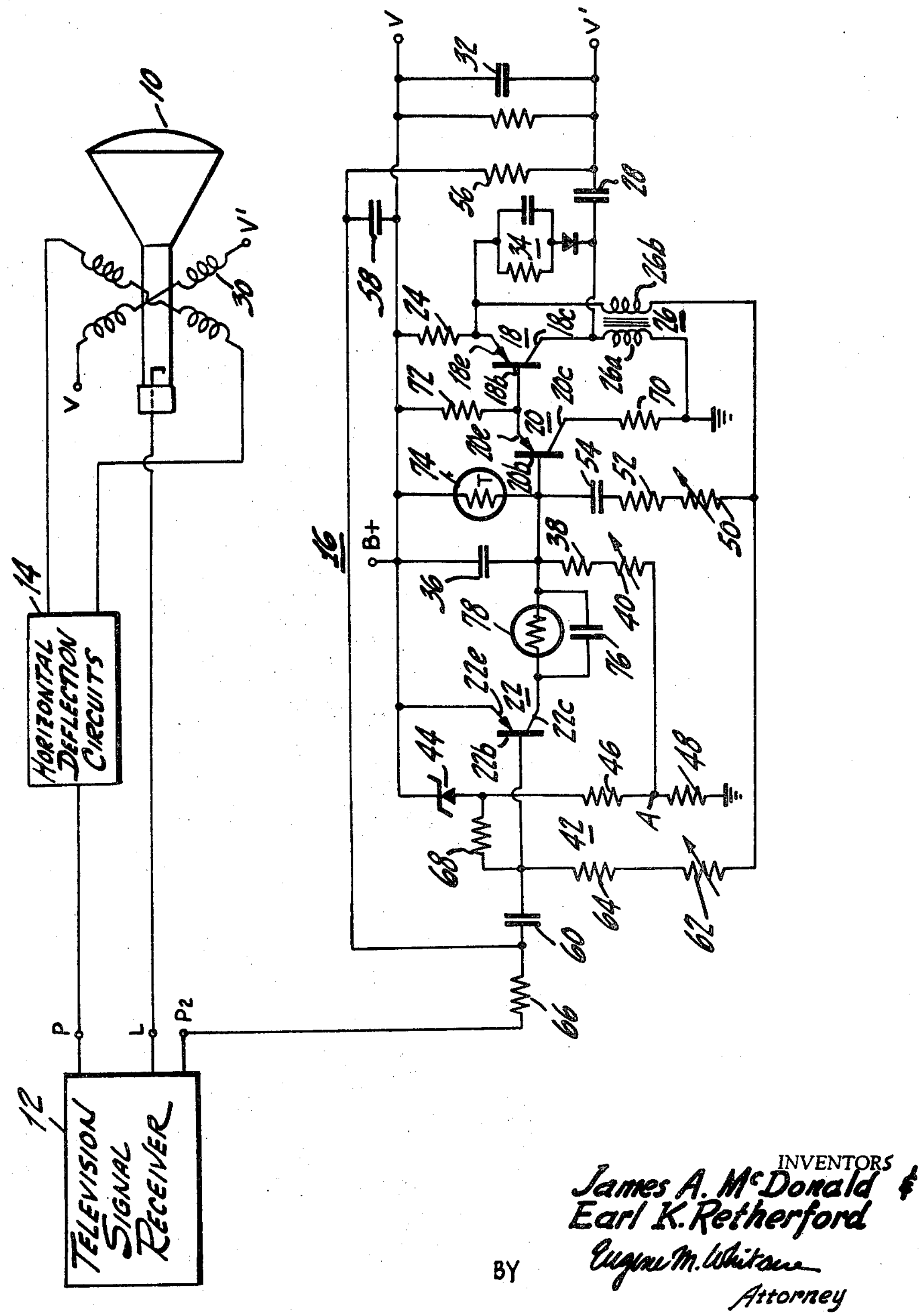
INVENTORS
James A. McDonald &
Earl K. Retherford
BY Eugene M. Whitacre
Attorney 3,402,319
Patented Sept. 17, 1968

3,402,319

TELEVISION DEFLECTION CIRCUIT WITH TEMPERATURE COMPENSATION

James A. McDonald and Earl K. Retherford, Indianapolis, Ind., assignors to Radio Corporation of America, a corporation of Delaware Filed Mar. 28, 1966, Ser. No. 538,076
6 Claims. (Cl. 315—27)

ABSTRACT OF THE DISCLOSURE

A transistorized multivibrator type vertical deflection circuit is provided with a compensating impedance in the series discharge path of the sawtooth capacitor so as to retain sufficient charge on the capacitor at the end of retrace to provide the finite turn-on voltage required for the output amplifier substantially immediately at the beginning of trace. The illustrated compensating impedance comprises the parallel combination of a thermistor and a capacitor arranged to compensate for variations in the required turn-on voltage with respect to temperature. Top cramping of the scanning raster in the vertical direction is precluded.

This invention relates to electromagnetic cathode ray beam deflection circuits of the type employed in television receivers and, in particular, to transistor vertical deflection circuits including apparatus for substantially improving the vertical linearity of the scanning raster produced on an associated cathode ray tube.

One type of transistor vertical deflection circuit utilizes a capacitor which is charged through a relatively high impedance from a source of direct voltage. The voltage produced across the capacitor is applied to a transistor amplifier to generate a substantially sawtooth shaped current for application to vertical deflection windings associated with a cathode ray tube. The electron beam of the cathode ray tube is thereby deflected in the vertical direction. A switching device coupled across the capacitor is utilized to discharge the capacitor at a predetermined time in the deflection cycle to return the electron beam to its initial position to prepare for the next deflection cycle. The deflection circuit is rendered self-oscillating by feeding back to the switching device a retrace voltage pulse that is developed when the current supplied to the vertical deflection windings ceases. The deflection cycles are synchronized by means of vertical synchronizing signals transmitted to the television receiver along with the image information.

In such circuits, a finite voltage is required at the input of the transistor amplifier (i.e., between base and emitter) at the beginning of the trace portion of each deflection cycle to initiate conduction and thereby commence production of the desired sawtooth deflection waveform across the deflection windings. The required finite voltage varies as a function of operating temperature of the amplifier where transistors are used. In the absence of means for providing such a voltage, the image produced upon the cathode ray tube is noticeably and undesirably "cramped" at the top (i.e., at the beginning of vertical trace).

In accordance with the present invention, the desired vertical linearity is achieved by providing impedance means in the series discharge path of the capacitor (which includes the switching device) so as to retain sufficient charge on the capacitor at the end of retrace to provide the desired turn-on voltage for the output amplifier substantially immediately at the beginning of trace. In a preferred embodiment of the invention, temperature responsive impedance means are provided to compensate for variations in the required turn-on voltage with respect to temperature.

A primary object of the present invention therefore is to provide an improved transistor vertical deflection circuit.

A further object of the present invention is to provide an improved transistor vertical deflection circuit including apparatus for precluding undesired non-linearity in the vertical direction of the scanning raster produced on an associated cathode ray tube.

The novel features that are considered characteristic of this invention are set forth with particularity in the appended claims. The invention itself, however, both as to its organization and method of operation as well as additional objects thereof will best be understood from the following description when read in connection with the accompanying drawing.

In the drawing, the bulk of the circuits of a television receiver serving to provide signals for energizing an image reproducing device such as a kinescope 10 are represented by a single block 12 labelled "Television Signal Receiver." The receiver unit 12 incorporates the usual elements required to provide video signals (at output terminal L) for appropriate intensity modulation of the electron beam of kinescope 10, as well as to provide suitable synchronizing pulse information (at terminals $P_1$ and $P_2$) to synchronize, in respective horizontal and vertical deflection circuits 14 and 16, the energization of the respective windings (H, H' and V, V') of the deflection yoke associated with kinescope 10.

The vertical deflection circuit shown in the drawing comprises an output transistor 18 having a base **18*b*, a collector 18*c*, and an emitter 18*e*; an emitter follower driver transistor 20 having a base 20*b*, a collector 20*c*, and an emitter 20*e*; and a switching transistor 22 having a base 22*b*, a collector 22*c*, and an emitter 22*e*. The emitter 18*e* of output transistor 18 is coupled by means of an anti-lock-on resistor 24 to a first terminal of a source of operating voltage B+. The collector 18*c* is connected to a second terminal, shown as chassis ground, of the voltage source through the primary winding 26*a* of a transformer 26. The collector 18*c* is further connected by means of a coupling capacitor 28 to one terminal V' of the vertical deflection windings 30, the terminal V being connected to B+. A bypass capacitor 32 for bypassing signals at frequencies greater than the vertical deflection frequency (e.g., horizontal deflection frequency) is also coupled between the terminals V and V'. A clamping circuit 34 is coupled between emitter 18*e* and collector 18*c* to protect output transistor 18** against excessive voltages during the retrace interval.

In order to supply a sawtooth driving signal to the base **18*b* of the output transistor 18, a sawtooth capacitor 36 is connected between the base 20*b* of driver transistor 20 and the source of operating voltage B+. The side of capacitor 36 which is coupled to base 20*b* is also coupled by means of the series combination of a fixed resistor 38 and a variable resistor 40, the latter serving as a vertical size control, to a point of reference potential A provided by a voltage divider 42. The voltage divider 42 comprises the series combination of a Zener diode 44 and first and second fixed resistors 46 and 48** coupled between the source of operating voltage B+ and chassis ground.

The driving voltage applied to base **20*b* of transistor 20 is properly shaped by feedback from the secondary winding 26*b* of transformer 26 to the base 20*b***.

This feedback modifies the current through the vertical deflection windings 30 to improve the linearity of the scanning raster in the vertical direction. A linearity control potentiometer 50 and a limiting resistor 52 are included in the feedback connection. Variation of the linearity control 50 varies the shape of the driving voltage on the base 20*b*. A capacitor 54 to prevent undesired relatively low frequency oscillations is also included in the feedback connection.

In order to maintain self-oscillations in the circuit, the voltage appearing at the terminal V′ is fed back through a network comprising resistor 56, capacitor 58, and coupling capacitor 60 to the base 22*b* of switching transistor 22. To enhance the accuracy of the timing of the vertical deflection waveform generation, an additional waveform is fed back from the output transistor 18 to the base 22*b* of switching transistor 22. This additional waveform is derived from the secondary winding 26*b* of transformer 26. The waveform across secondary winding 26*b* may be described as a sawtooth plus a retrace spike. This waveform is fed back to base 22*b* via a resistive path including a variable resistor vertical hold control 62 and a fixed resistor 64. The resistive path cooperates with the capacitance present at base 22*b* to integrate the derived waveform thereby adding a generally parabolic component to the waveform at base 22*b*. The produced waveform may be adjusted by means of hold control 62 to provide a steep slope near the end of the trace interval rendering the timing of the turn-on of switching transistor 22 substantially insensitive to noise or changes in circuit parameters.

The operation of switching transistor 22 is synchronized with respect to the image portion of the received television signal by means of vertical synchronizing pulses applied from terminal $P_2$ via resistor 66 and capacitor 60 to base 22*b*.

A stabilized DC bias for the base 22*b* of switching transistor 22 is provided by means of the connection of resistor 68 between base 22*b* and the junction of Zenere diode 44 and resistor 46.

The emitter follower driver transistor 20 includes a resistor 70 coupled between collector 20*c* and ground and a resistor 72 connected between emitter 20*e* and the B+ voltage supply. Temperature compensation of the base-emitter bias of driver transistor 20 is provided by means of thermistor 74 connected between base 20*b* and the B+ terminal.

In accordance with the present invention, impedance means comprising the parallel combination of capacitor 76 and thermistor 78 are coupled in the discharge path of sawtooth capacitor 36 between collector 22*c* of switching transistor 22 and base 20*b* of driver transistor 20.

The operation of the circuit is best described by assuming that the sawtooth capacitor 36 initially is discharged. Capacitor 36 begins to charge via the circuit path including resistor 38, height control 40 and resistor 48 such that the base electrode 20*b* of driver transistor 20 is driven in a negative direction (i.e. less positive) with respect to emitter 20*e*. As the voltage across sawtooth capacitor 36 increases, driver transistor 20 and consequently output transistor 18 are driven into conduction. The voltage at collector 18*c* rises towards the B+ level producing, under the combined influence of the voltage across capacitor 36 and the feedback applied to base 20*b*, a slightly S-shaped current waveform in the vertical deflection windings 30. At the end of the trace portion of the deflection cycle, a vertical synchronizing pulse is applied to base 22*b* of switching transistor 22. As transistor 22 is turned on, sawtooth capacitor 36 begins to discharge rapidly through the path including the parallel combination of thermistor 78 and capacitor 76 and the emitter-collector circuit of switching transistor 22. Transistors 20 and 18 thereupon are driven towards cut-off tending to abruptly reduce the current through vertical deflection windings 30 and thereby generate a large retrace voltage pulse across such windings. The retrace voltage pulse is coupled back through the network including resistor 56 and capacitor 58 to the base of switching transistor 22*b*, causing heavy base current to flow and thereby charging capactor 60 in such a manner as to maintain switching transistor 22 cut-off after the cessation of the retrace pulse.

The circuit parameters are adjusted such that, as the voltage across sawtooth capacitor 36 approaches zero, switching transistor 22 is one more driven to cut-off, ending the discharge cycle of capacitor 36 and re-commencing the charging or trace cycle. The above-described operation is repeated for each vertical deflection cycle.

The functioning of the impedance means comprising thermistor 78 and capacitor 76 now will be considered in greater detail.

In a deflection circuit of the type described above, a small negative voltage (about 0.7 volt for silicon transistors) must be applied between the base and emitter electrodes 18*b* and 18*e* of output transistor 18 before conduction commences in the output circuit of that transistor. If the capacitor 36 is permitted to discharge completely during the retrace interval, during the initial portion of the trace interval transistor 18 will be biased in a non-conductive state until the required voltage builds up on capacitor 36. The linear change in the current flowing in deflection windings 30, therefore will not commence until some time after the end of retrace. As a result, the image produced on kinescope 10 will be "cramped" at the top.

In accordance with one aspect of the present invention, the thermistor 78 modifies the discharging rate of capacitor 36 such that a sufficient voltage remains across capacitor 36 at the end of retrace to cause transistor 18 to begin conduction substantially immediately at the beginning of trace. Capacitor 76 is provided to modify the operation of the discharging circuit so as to provide the required discharge of capacitor 36 within the retrace time interval. In accordance with a further aspect of the invention, thermistor 78 is selected to provide an impedance which varies as a function of temperature so as to compensate for the fact that the turn-on voltage required between base 18*b* and emitter 18*e* varies with temperature. Since the required turn-on voltage decreases as temperature increases, thermistor 78 is chosen to have a negative temperature coefficient (resistance decreases as temperature increases). The discharge rate of capacitor 36 therefore increases as temperature increases.

By way of example, a set of values for the circuit parameters shown in the drawing, which values have proven satisfactory in operation, are presented below.

| | |
|---|---|
| B+ supply voltage | +12 volts. |
| Transistor 18 | 2N2869. |
| Transistor 20 | 2N2614. |
| Transistor 22 | 2N3638. |
| Resistor 24 | 2.2 ohms. |
| Capacitor 28 | 250 microfarads. |
| Vertical deflection windings 30 | 83 millihenrys, 36 ohms. |
| Capacitor 32 | .039 microfarad. |
| Capacitor 36 | 18 microfarads. |
| Resistor 38 | 3300 ohms. |
| Potentiometer 40 | 3500 ohms. |
| Zener diode 44 | 6.8 volts. |
| Resistor 46 | 10 ohms. |
| Resistor 48 | 100 ohms. |
| Potentiometer 50 | 10,000 ohms. |
| Resistor 52 | 1,000 ohms. |
| Capacitor 54 | 5 microfarads. |
| Resistor 56 | 2200 ohms. |
| Capacitor 58 | 0.33 microfarad. |
| Capacitor 60 | 0.47 microfarad. |
| Potentiometer 62 | 15,000 ohms. |
| Resistor 64 | 5600 ohms. |
| Resistor 66 | 2700 ohms. |
| Resistor 68 | 220,000 ohms. |
| Resistor 70 | 3300 ohms. |
| Resistor 72 | 68 ohms. |
| Thermistor 74 | 3300 ohms at 25° C. |
| Capacitor 76 | 20 microfarads. |
| Thermistor 78 | 16 ohms at 25° C. 8 ohms at 45° C. |

What is claimed is:

1. In a television receiver having a cathode ray image reproducing tube and vertical deflection windings associated with said tube, a vertical deflection circuit comprising:

a transistor amplifier having input, output and common terminals;

a first capacitor coupled to said amplifier input terminal;

a charging circuit for said capacitor including a direct voltage supply and resistance means for coupling said capacitor to said voltage supply;

a discharging circuit for said capacitor including a switching device having input, output, and common terminals and impedance means coupled between said capaictor and said switching device output terminal for providing sufficient voltage at said amplifier input terminal to initiate conduction in said amplifier substantially at the commencement of the trace portion of each vertical deflection cycle, said impedance means comprising a temperature sensitive resistance having a temperature coefficient selected to modify the discharging rate of said capacitor so as to compensate for temperature variations in the voltage required at said amplifier input terminal to initiate conduction in said amplifier;

means for coupling said vertical deflection windings between said output and common terminals of said amplifier;

and feedback means coupled between said amplifier output terminal and said switching device input terminal for producing self-oscillations in said circuit.

2. In a television receiver, a vertical deflection circuit according to claim 1 wherein said temperature sensitive resistor exhibits a negative temperature coefficient of resistance.

3. In a television receiver, a vertical deflection circuit according to claim 2 wherein said impedance means further comprises a second capacitor coupled in parallel relation with said temperature sensitive resistor.

4. In a television receiver, a vertical deflection circuit according to claim 3 wherein said first and second capacitors exhibit capacitance values of a like order of magnitude.

5. In a television receiver, a vertical deflection circuit according to claim 1 wherein said input, output and common terminals of said amplifier comprise, respectively, base, collector and emitter electrodes.

6. In a television receiver, a vertical deflection circuit according to claim 5 wherein said first capacitor is coupled to said amplifier base terminal by means of at least one transistor arranged in an emitter follower configuration.

References Cited

UNITED STATES PATENTS 3,134,928 5/1964 Freedman ------------ 315—27
3,247,419 4/1966 Atwood -------------- 315—27

RODNEY D. BENNETT, *Primary Examiner.*

J. G. BAXTER, *Assistant Examiner.*